(12) United States Patent
Sugita et al.

(10) Patent No.: US 7,438,040 B2
(45) Date of Patent: Oct. 21, 2008

(54) LOW FLOOR TYPE MOTORCYCLE

(75) Inventors: Haruomi Sugita, Wako (JP); Heijiro Yoshimura, Wako (JP); Osamu Suzuki, Wako (JP); Atsushi Ogasawara, Wako (JP); Yukinori Kurakawa, Wako (JP); Yukiya Ueda, Wako (JP); Toshio Yamamoto, Wako (JP); Takayuki Konuma, Wako (JP); Mitsuo Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 11/523,029

(22) Filed: Sep. 19, 2006

(65) Prior Publication Data

US 2007/0062752 A1 Mar. 22, 2007

(30) Foreign Application Priority Data

Sep. 21, 2005 (JP) ............................. 2005-274347
Sep. 21, 2005 (JP) ............................. 2005-274550

(51) Int. Cl.
*F02B 75/22* (2006.01)
(52) U.S. Cl. ..................... 123/195 R; 180/219; 180/309
(58) Field of Classification Search ............. 123/195 R; 180/219, 309
See application file for complete search history.

(56) References Cited

U.S. PATENT DOCUMENTS

| 5,568,726 | A  | * | 10/1996 | Yamada et al. ............... 180/219 |
| 6,019,074 | A  | * | 2/2000 | Otome ..................... 123/65 P |
| 6,761,239 | B2 | * | 7/2004 | Kawamoto ................... 180/219 |
| 2002/0027032 | A1 | * | 3/2002 | Tsutsumikoshi ............ 180/219 |

FOREIGN PATENT DOCUMENTS

JP 11-99980 A 4/1999
JP 2002/79982 A 3/2002

* cited by examiner

*Primary Examiner*—Noah Kamen
(74) *Attorney, Agent, or Firm*—Birch, Stewart, Kolasch & Birch, LLP

(57) ABSTRACT

A motorcycle with a low floor is configured such that secondary vibration of an engine can be largely reduced and an increase in engine width can be suppressed. The motorcycle with a low floor includes step floors on which to put a rider's feet on left and right sides of a vehicle body frame. An engine is provided between the step floors. A plurality of exhaust pipes extend respectively from cylinders of the engine, the exhaust pipes being gathered at a gathering portion. The engine is an in-line 3-cylinder engine having cylinder portions inclined forwardly. The exhaust pipes extend downwards from the cylinder portions on the basis of each cylinder. The exhaust pipes are bundled and extend on the right side of the engine, in a position on the lower side of one of the step floors.

15 Claims, 12 Drawing Sheets

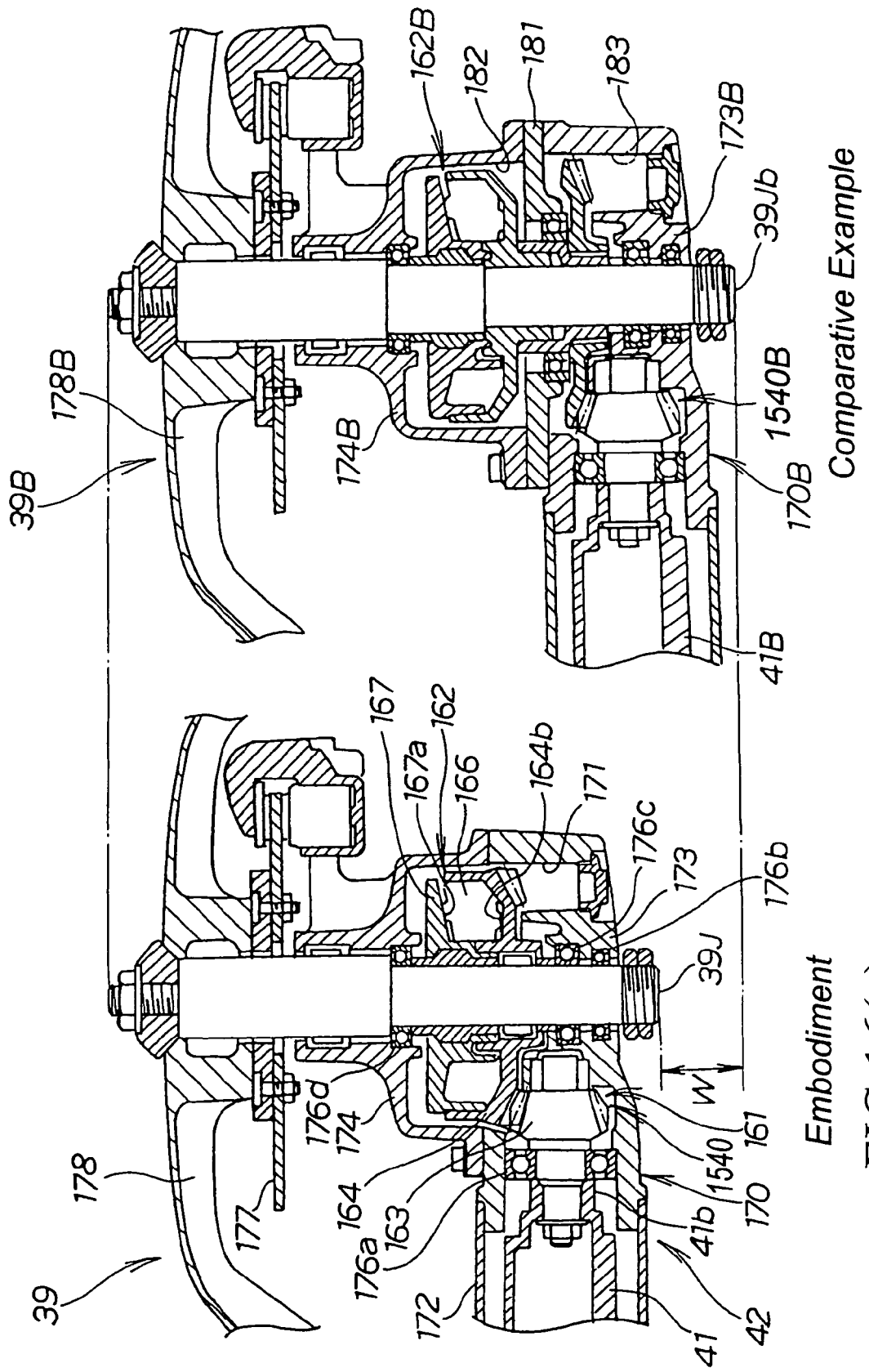
FIG.16(a) Embodiment
FIG.16(b) Comparative Example

LOW FLOOR TYPE MOTORCYCLE

CROSS-REFERENCE TO RELATED APPLICATION

The present application claims priority under 35 U.S.C. §119 to Japanese Patent Application Nos. 2005-274347 and 2005-274550, both filed Sep. 21, 2005, the entire contents of which are hereby incorporated by reference.

BACKGROUND OF THE INVENTION

1. Field of the Invention

The present invention relates to a low floor type motorcycle having a cover member for covering a vehicle body frame, an engine on the lower side of the cover member, and exhaust pipes extending respectively from cylinders of the engine, the exhaust pipes being gathered at a gathering portion.

2. Description of Background Art

A low floor type motorcycle having a cover member for covering a vehicle body frame and an engine on the lower side of the cover member has been known. (Refer, for example, to Japanese Patent Laid-open No. 2002-79982 (FIG. 2).)

In FIG. 2 of Japanese Patent Laid-open No. 2002-79982, the motorcycle 1 includes a vehicle body frame 2, and an engine unit 41 (hereinafter referred to simply as the engine 41) is suspended from the vehicle body frame 2.

The engine 41 is a 2-cylinder engine comprising a balancer shaft 67 (hereinafter referred to as the balance shaft 67) on the upper side of a crankshaft 61 at the mating plane between a cylinder block 47 and a crankcase 48.

The balance shaft 67 provided for the 2-cylinder engine as above-mentioned is generally a primary balance shaft for reducing primary vibration. When the balance shaft 67 is provided for the 2-cylinder engine, the primary vibration of the engine 41 can be reduced.

In this engine form, however, secondary vibration is left as it is, though the primary vibration can be canceled by the balance shaft. As a result, in the low floor type motorcycle having resin-made exterior component parts, the secondary vibration generated at the engine 41 may be transmitted, for example, a cover member or the like constituting a part of the exterior component parts, resulting in the generation of sounds of the cover member or the like.

As a countermeasure against the vibration of the exterior component parts, there is a method in which rubber mounts are adopted in a support structure for the engine so as to insulate the vibration of the engine. In this case, however, the number of component parts is increased, since members for augmenting the rigidity of the vehicle and the like are separately needed for enabling high-speed running.

Meanwhile, for reducing the secondary vibration, an increase in the number of cylinders of the engine is effective. For example, when a 4-cylinder engine is applied to the low floor type motorcycle, the secondary vibration can be reduced. However, application of a 4-cylinder or 6-cylinder engine increases the engine width (the side of the engine in the vehicle width direction, here and hereinafter) too much, thereby making it difficult to retain the form of the low floor type motorcycle as a motor scooter type vehicle.

In addition, a low floor type motorcycle in which exhaust pipes extend respectively from cylinders of an engine and are gathered at a gathering portion has been known. (See, for example, Japanese Patent Laid-open No. Hei 11-99980 (FIG. 2).)

FIG. 2 of Japanese Patent Laid-open No. Hei 11-99980 is a plan view of a motorcycle having a low floor type floor, in which the motorcycle 1 has a horizontally opposed type internal combustion engine 3 (hereinafter referred to as the engine 3), left and right cylinders 4l and 4r possessed by the engine 3 are disposed respectively on the front side of left and right floors 2l and 2r, an exhaust pipe 32r extends rearwards from the cylinder 4r, an exhaust pipe 32l extends rearwards from the cylinder 4l, and the exhaust pipe 32l extends to the side of the exhaust pipe 32r and gathered to the exhaust pipe 32r.

However, since the exhaust pipe 32l extending rearwards extends to the side of the exhaust pipe 32r and gathered to the exhaust pipe 32r, it is necessary to secure a sufficient space on the rear side of the engine 3, for example, to secure a sufficient spacing between the exhaust pipe 32l and a rear fork 14 permitted to swing up and down (hereinafter referred to as the rear swing arm 14).

In addition, since the exhaust pipes 32l and 32r extend toward the rear side of the engine 3, the position of the gathering portion where the exhaust pipe 32l and the exhaust pipe 32r are gathered together is restricted to the rear side of the engine 3. Therefore, the length of each exhaust pipe from each cylinder of the engine 3 to the gathering portion must assuredly set to be not less than a predetermined value. In addition, in the case where one of the exhaust pipes extend to the side of the other of the exhaust pipes as in the prior art, restrictions may be generated as to the adjustment of power performance between the cylinders; for example, there is generated a large difference in length between the exhaust pipes.

Given the above described problems, there is a need for a technology by which the secondary vibration of an engine can be largely reduced and an increase in the engine width can be suppressed. Further, there is a need for a low floor type motorcycle such that it is unnecessary to provide a space for disposing exhaust pipes on the rear side of the engine, and such that adjustment of power performance between cylinders can be performed in a flexible manner.

SUMMARY AND OBJECTS OF THE INVENTION

An object of the present invention is to configure a low floor type motorcycle so that secondary vibration of an engine can be minimized, and so that provision of a space for disposing exhaust pipes on the rear side of the engine is not necessary, and so that adjustment of power performance between cylinders can be performed in a flexible manner.

According to a first aspect of the present invention, a low floor type motorcycle includes step floors on which to put the rider's feet on the left and right sides of a vehicle body frame. A cover member is provided between the step floors to cover the vehicle body frame, an engine provided on the lower side of the cover member, and a plurality of exhaust pipes extending respectively from cylinders of the engine, the exhaust pipes being gathered at a gathering portion. The engine is an in-line 3-cylinder engine having cylinder portions inclined forwardly.

According to a second aspect of the present invention the engine is provided with a balance shaft for reducing primary couple vibration.

According to a third aspect of the present invention, the vehicle body frame includes upper members extending from a head pipe to the upper side of the engine, and down members extending from the head pipe to lateral sides of cylinder portions of the engine, and the engine is supported by lower end portions of the down members.

According to a fourth aspect of the present invention, the engine is fixed directly to the vehicle body frame, without any elastic member therebetween.

According to a fifth aspect of the present invention, a cover member is provided between the step floors to cover the vehicle body frame, an engine disposed on the lower side of the cover member, and a plurality of exhaust pipes extending respectively from cylinders of the engine, the exhaust pipes being gathered at a gathering portion. The exhaust pipes are disposed in the state of being bundled on the lower side of one of the step floors on the left and right sides.

According to a sixth aspect of the present invention, the gathering portion is disposed on the lower side of the step floor.

According to a seventh aspect of the present invention, the engine is a water-cooled type engine, and a cooling water pipe provided for the engine is disposed on the other side opposite to the one side where the exhaust pipes are disposed.

According to a eighth aspect of the present invention, the engine incorporates a cooling water pump, and the cooling water pump is disposed on the opposite side in the left-right direction of the exhaust pipes with reference to a vehicle center line in plan view.

According to a ninth aspect of the present invention, the engine has cylinder portions inclined forwardly, the exhaust pipes extend downwards from the cylinder portions on the basis of each cylinder, and the exhaust pipes are bundled and extended to one of the left and right sides of the engine.

According to a tenth aspect of the present invention, an exhaust valve for regulation of opening area according to the running conditions is provided in the vicinity of the gathering portion.

EFFECTS OF THE INVENTION

According to the first aspect of the present invention, the engine is an in-line 3-cylinder engine, so that as compared, for example, with an in-line 2-cylinder engine, the displacement of each cylinder is smaller, and the vertical movement component parts such as connecting rod and piston in each cylinder are lighter in weight. In addition, by regulating the balance weight for the crank, the primary vibration of the engine arising from vertical motions of the pistons and the like can be reduced. Further, the secondary vibration of the engine arising from left-right motions of the connecting rods, piston pins and the like can be reduced. With the secondary vibration thus reduced, the comfortableness during running can be enhanced.

Also, since the secondary vibration can be reduced, in a low floor type motorcycle having a large number of exterior component parts such as a resin-made vehicle body cover, for example, vibrations at such frequencies as to easily generate sounds at the exterior component parts can be reduced.

Meanwhile, even in a low floor type motorcycle as a motor scooter type vehicle, secondary vibration can be reduced if a 4-cylinder or 6-cylinder engine can be applied. However, application of a 4-cylinder or 6-cylinder engine to a low floor type motorcycle makes it difficult to retain the form of the motor scooter type vehicle, due to the need to secure the engine width.

From this point of view, in the present invention, the engine is an in-line 3-cylinder engine, so that the engine width is not enlarged too much, and the form of the motor scooter type vehicle can be retained.

Accordingly, by adoption of the in-line 3-cylinder engine, it is possible to attain a low floor type motorcycle such that the secondary vibration can be largely reduced and that the engine width is not enlarged too much.

Further, since the engine has the cylinder portions inclined forwardly, a lowering of the center of gravity of the vehicle can be contrived. With a lowering of the center of gravity thus contrived, maneuverability can be enhanced.

According to the second aspect of the present invention, the balance shaft for reducing couple vibrations is provided, so that the primary couple vibration arising from a vibration phase difference between the left and right sides can be reduced.

Since the primary couple vibration can be thus reduced, the transmission of the primary couple vibration generated from the engine to the vehicle body frame is suppressed, whereby the comfortableness during running can be further enhanced.

According to the third aspect of the present invention, the vehicle body frame includes the upper members extending to the upper side of the engine and the down members extending to lateral sides of the cylinder portions, so that the engine can be arranged at a low position while securing the rigidity of connection between the vehicle body frame and the engine in the low floor type vehicle.

In addition, since the engine is supported by lower end portions of the down members, it is possible to mount and dismount the engine easily.

According to the fourth aspect of the present invention, the engine is fixed directly to the vehicle body frame, a predetermined vehicle body rigidity can be secured while adopting a so-called diamond type frame in which the engine is utilized as a part of the vehicle body frame. In addition, it is possible to make it difficult for the engine vibration to be transmitted to the vehicle body frame.

Since the rigidity of connection between the engine and the vehicle body frame is enhanced and the engine can be arranged to be low so as thereby to optimize the position of the center of gravity, the running performance of the low floor type vehicle can be further enhanced.

As a result, the comfortableness during running, particularly during high-speed running, can be largely enhanced.

According to the fifth aspect of the present invention, the plurality of exhaust pipes are bundled, so that the exhaust pipes can be concentrated on one of the left and right sides of the vehicle body frame, instead of being dispersed with respect to each other. Since the exhaust pipes can be concentrated on one of the left and right sides of the vehicle body frame, the space around the engine can be saved.

In addition, since the exhaust pipes are disposed on the lower side of the step floor, the appearance quality of the motorcycle can be enhanced.

Since the exhaust pipes can thus be concentrated on one of the left and right sides of the vehicle body frame, the exhaust pipes are not passed on the rear side of the engine, and the exhaust pipe space on the rear side of the engine can be utilized effectively. Since the exhaust pipe space on the rear side of the engine can be utilized effectively, it is possible to enhance the degree of freedom in designing the vehicle, for example, in layout of a rear swing arm.

According to the sixth aspect of the present invention, the gathering portion is disposed on the lower side of the step floor.

In a low floor type motorcycle, a space triangular in section which is defined by a side surface of the engine and a surface for securing a bank angle is provided on the lower side of the step floor, so that the gathering portion can be freely arranged on the lower side of the step floor. Since the degree of freedom in laying out the gathering portion is thus enhanced, it is possible, for example, to freely set the length of each exhaust pipe from each cylinder to the gathering portion. If the exhaust pipe lengths to the gathering portion can be set freely, adjustment of power performance between the cylinders can be easily performed, and the degree of freedom in designing can be enhanced.

According to the seventh aspect of the present invention, the exhaust pipes of the engine are disposed on the lower side of one of the left and right step floors in a bundled state, and the cooling water pipe provided for the engine is disposed on the lower side of the other of the step floors.

Since the cooling water pipe and the exhaust pipes are disposed respectively on the lower side of the left and right step floors, the exhaust pipes at a comparatively high temperature are disposed remote from the cooling water pipe, whereby the cooling efficiency can be enhanced.

According to the eighth aspect of the present invention, the cooling water pump for the engine is disposed on the opposite side in the left-right direction of the exhaust pipes in plan view.

Since the cooling water pump and the exhaust pipes are disposed respectively on the lower side of the left and right step floors, the cooling water pump can be spaced sufficiently from the exhaust pipes.

When the cooling water pump and the cooling water pipe are disposed on the lower side of the same step floor, the length of the cooling water pipe extending from the cooling water pump can be reduced, whereby a reduction in the weight of the vehicle can be contrived.

According to the ninth aspect of the present invention, the engine has the cylinder portions inclined forwardly, and the exhaust pipes extend downwards from the cylinder portions on the basis of each cylinder, so that a lowering of the center of gravity of the vehicle can be contrived.

Since a lowering of the center of gravity of the vehicle can thus be contrived, the maneuverability can be more enhanced.

Besides, since the exhaust pipes of the engine are bundled and extended to one of the left and right side of the engine, the exhaust pipes can be easily laid out on a lateral side of the engine.

In addition, since the engine has the cylinder portions inclined forwardly, the engine can be disposed to be low. Since the engine can thus be disposed to be low, the cover member can be disposed to be low, and the leg passing spaces located on the cover member can be secured to be wide.

According to the tenth aspect of the present invention In the invention as set forth in claim 6, the gathering portion where the exhaust pipes are gathered is arranged on the lower side of the step floor, and the exhaust valve constituting a part of a control mechanism for regulation of opening area according to the running conditions is provided in the vicinity of the gathering portion, so that by adjusting the position of the gathering portion in the front-rear direction, the exhaust valve can be disposed in the vicinity of the gathering portion without enlarging the width of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein and the accompanying drawings which are given by way of illustration only, and thus are not limitative of the present invention, and wherein:

FIG. 16(*a*) is a sectional view for illustrating the power transmission mechanism provided in the low floor type motorcycle according to the present invention, and FIG. 16(*b*) shows a comparative example.

DETAILED DESCRIPTION OF THE PREFERRED EMBODIMENTS

In the following description, the terms "Front", "Rear", "Left", "Right", "Up" and "Down" refer to the sides or directions as viewed from the rider.

Figure 1:
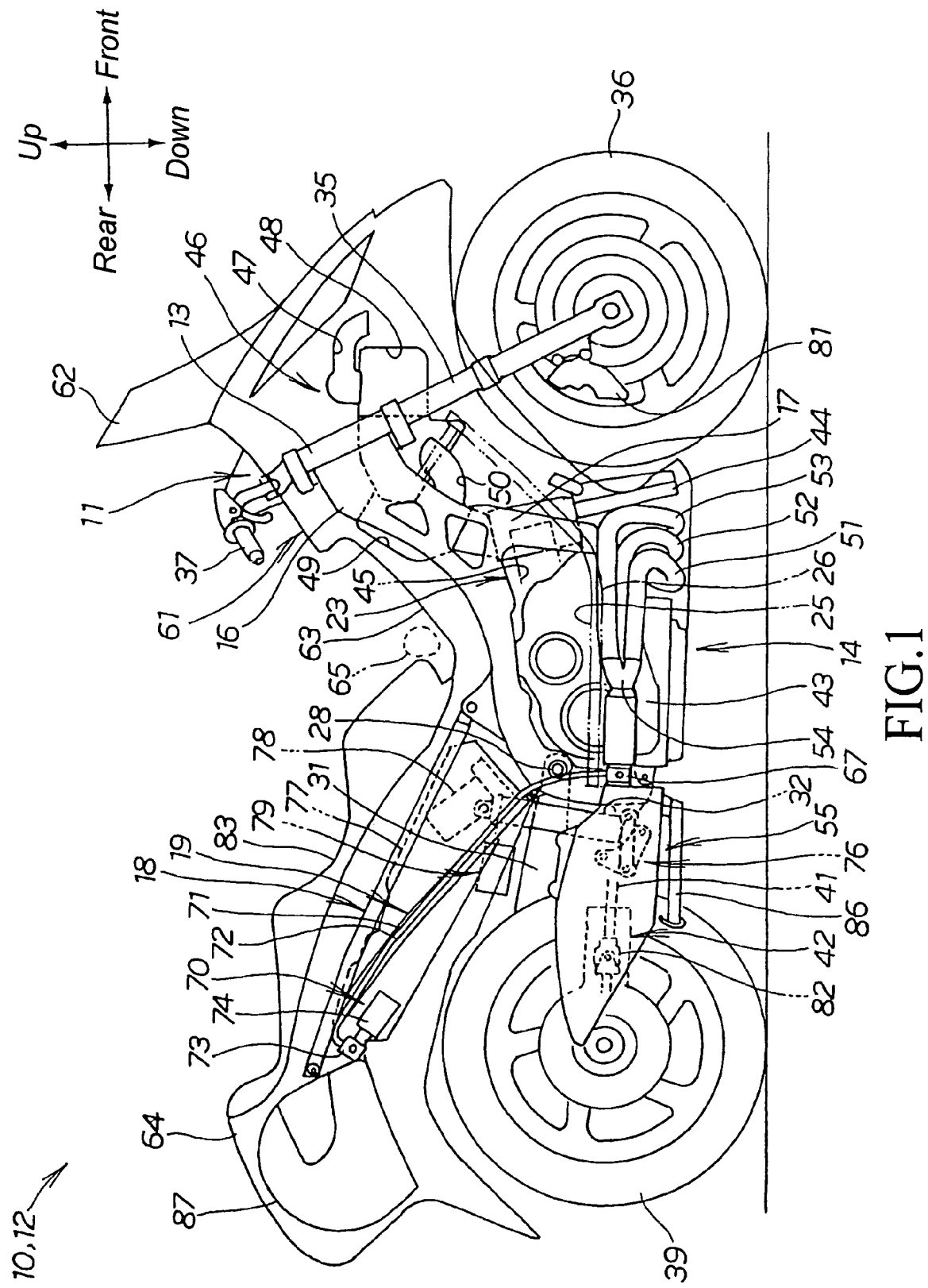
FIG. 1 is a sectional view of a right side portion of a low floor type motorcycle according to the present invention.

FIG. 1 is a sectional view of a right side portion of a low floor type motorcycle according to the present invention. The motorcycle 10 is a vehicle comprising a vehicle body frame 11, which includes: a head pipe 13 provided at a front end portion of the vehicle 12; upper members 16, 16 (only symbol 16 on the viewer's side is shown) provided on the upper side of an engine 14 and extending rearwards from the head pipe 13; seat rails 18, 18 (only symbol 18 on the viewer's side is shown) extending skewly rearwardly upwards from the upper members 16, 16; support frames 19, 19 (only symbol 19 on the viewer's side is shown) supporting the seat rails 18, 18 from the lower side; down members 17, 17 (only symbol 17 on the viewer's side is shown) branched from the upper members 16, 16, located on lateral sides of a cylinder block 23 of the engine 14 and extending downwards; and floor brackets 26, 26 also extending rearwards from upper portions of the upper members 16, 16 so as to mount step floors 25, 25 (only symbol 25 on the viewer's side is shown) thereon.

A pivot shaft 28 is attached to the upper members 16, 16, a rear swing arm 31 is so mounted as to be vertically swingable with the pivot shaft 28 as a center, and a rear cushion unit 32 is mounted between the rear swing arm 31 and the vehicle body frame 11.

In addition, the motorcycle 10 is a vehicle in which a front fork 35 is steerably mounted on the head pipe 13, a front wheel 36 is rotatably mounted on the lower ends of the front fork 35, a steering handle 37 is mounted on an upper portion of the front fork 35, the engine 14 is disposed in a space formed between the upper member 16 and the down member 17, a rear wheel 39 is rotatably mounted on the rear end of the rear swing arm 31, and a power transmission mechanism 42 including a drive shaft 41 is interposed between the engine 14 and the rear wheel 39 so as to drive the rear wheel 39.

Namely, the motorcycle 10 includes the vehicle body frame 11, the rear swing arm 31 swingably mounted on the vehicle body frame 11 through the pivot shaft 28, the engine 14 fixed to the vehicle body frame 11, and the power transmission mechanism 42 for transmitting a drive force from the engine 14 to the rear wheel 39 through the drive shaft 41.

A main body of the engine 14 includes a crankcase 43, and the cylinder block 23 attached to the crankcase 43 in a forwardly inclined state. The engine 14 is a water-cooled type in-line 3-cylinder engine, equipped with a radiator portion 44 on the lower side of the cylinder block 23 and on the rear side of the front wheel 36.

The cylinder block 23 is provided with cylinder portions 45 each having a cylindrical inside surface. The number of the cylinder portions 45 is three.

An air cleaner unit 46 constituting a part of an intake system will be described.

The air cleaner unit 46 includes an air intake duct 47 provided on the front side of the head pipe 13, a first chamber 48 provided on the lower side of the air intake duct 47, and a second chamber 49 provided on the rear side of the first chamber 48, with a connection duct 50 therebetween. Air taken in through the air intake duct 47 is first cleaned by an element (not shown) provided in the first chamber 48, the cleaned air is then led through the connection duct 50 into the second chamber 49, and, finally, the cleaned air is supplied from the second chamber 49 to the engine 14.

With the air cleaner unit 46 thus laid out on the front and rear sides of the head pipe 13, a sufficient capacity can be obtained, and the air cleaner unit 46 can be arranged in the vicinity of the engine 14.

Now, an exhaust system will be described. A first exhaust pipe 51, a second exhaust pipe 52 and a third exhaust pipe 53 are connected to the cylinder block 23 possessed by the in-line 3-cylinder engine 14, the first to third exhaust pipes 51 to 53 extend rearwards, the first to third exhaust pipes 51 to 53 are gathered at a gathering portion 54 provided on the rear side of these exhaust pipes 51 to 53, and a muffler 55 is connected on the rear side of the gathering portion 54.

The cover member 61 is a member for covering a part of the vehicle 12, and functions also as a cowl member. The cover member 61 includes a front cover member 62 for covering a front portion of the vehicle body frame 11 including the head pipe 13 and the like, an intermediate cover member 63 provided on the rear side of the front cover member 62, and a rear cover member 64 provided on the rear side of the intermediate cover member 63 so as to cover a rear-side portion of the vehicle 12.

Here, the intermediate cover member 63 is a member on the upper side of which a leg passing space 65 for passing a rider's leg when the rider rides on or gets off the vehicle 12 is provided, and on the lower side of which the engine 14 is provided. Therefore, the engine 14 is provided on the lower side of the leg passing space 65 for passing the rider's leg when the rider rides on or gets off the vehicle 12.

The step floors 25, 25 (only symbol 25 on the viewer's side is shown) are members attached to floor brackets 26, 26 constituting a part of the vehicle body frame 11, and are foot rest portions on which the rider's feet are put during running.

Specifically, the plurality of exhaust pipes 51 to 53 are bundled together and disposed on the lower side of the step floor 25, and the gathering portion 54 where the exhaust pipes 51 to 53 are bundled is laid out on the lower side of the step floor 25.

An exhaust valve 67 capable of choking the flow rate of the exhaust gas is provided in the vicinity of the gathering portion 54. The exhaust valve 67 is one of component members of an exhaust gas control system 70.

The exhaust gas control system 70 includes the exhaust valve 67 for regulation of opening area according to the running conditions, operating wires 71 and 72 for opening and closing the exhaust valve 67, a servo motor 73 for driving the operating wires 71 and 72, and a control unit 74 for controlling the servo motor 73 to thereby regulate the flow rate of the exhaust gas.

Also shown are a link mechanism 76 interposed between the rear cushion unit 32 and the rear swing arm 31, a fuel tank 77, a fuel pump, a reservoir tank 79 for the rear cushion unit 32, a front brake unit 81, a universal joint 82, a rider's seat 83, a main stand 86, and a helmet 87 contained in a luggage carrier.

Figure 2:
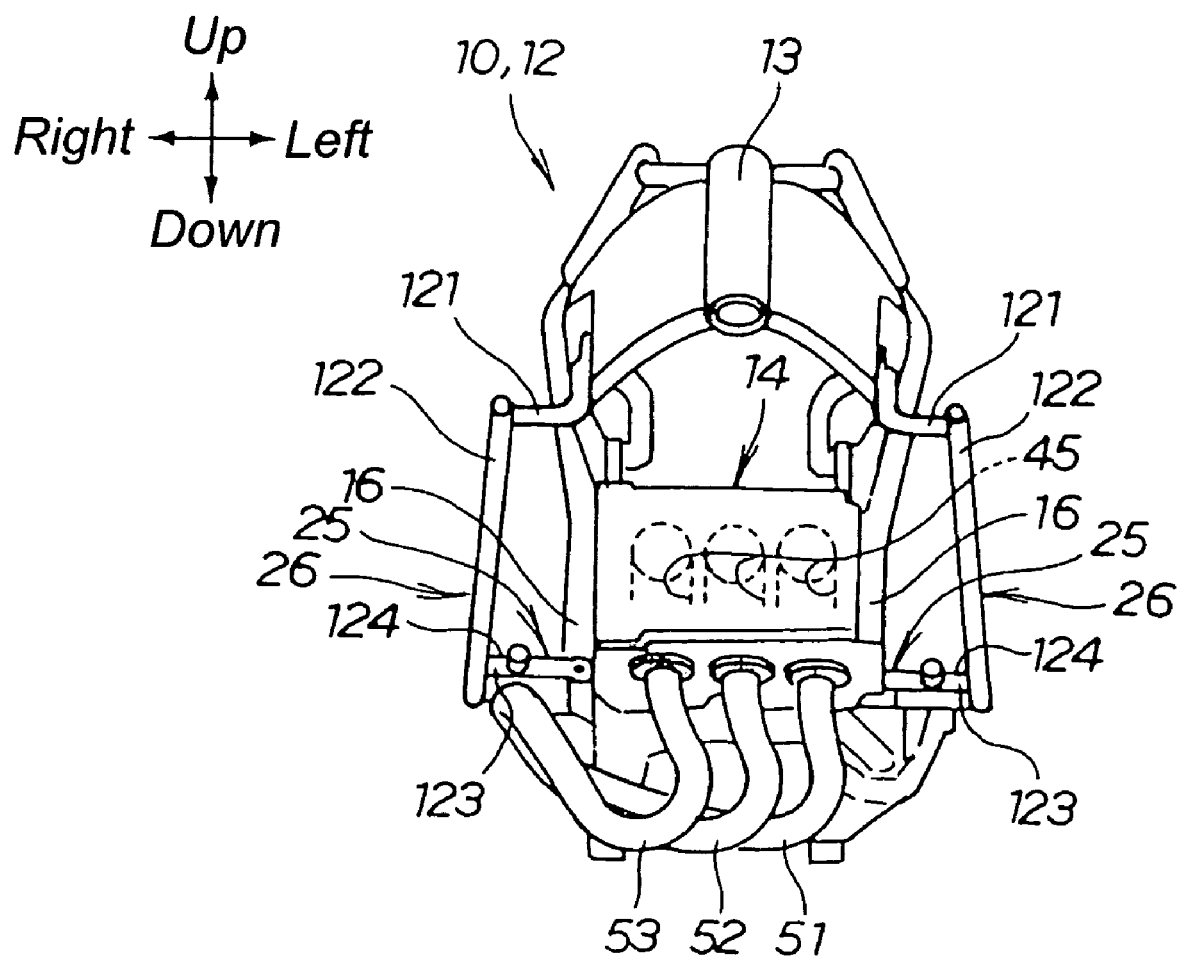
FIG. 2 is a front view for illustrating the layout of elements around an engine in the low floor type motorcycle according to the present invention.

FIG. 2 is a front view for illustrating the layout of elements around the engine in the low floor type motorcycle according to the present invention. The floor brackets 26, 26 are composed of: front sub-pipes 121, 121 extending skewly downwardly leftwards and rightwards from the upper members 16, 16; main pipes 122, 122 extending skewly downwardly rearwards from the front sub-pipes 121, 121; and rear sub-pipes 123, 123 connecting rear end portions of the main pipes 122, 122 and rear portions of the upper members 16, 16 to each other. In addition, floor members 124, 124 are provided to over the main pipes 121, 121, to form the step floors 25, 25.

The engine 14 is an in-line 3-cylinder engine having the cylinder portions inclined forwards as shown in FIG. 1. The engine 14 includes the cylinder portions 45 . . . ( . . . indicates plurality, here and hereinafter), and the exhaust pipes 51 to 53 extend downwards respectively from the cylinder portions 45 . . . on the basis of each cylinder, are then bundled, and extend on the right side of the engine 14.

Since the engine 14 includes the cylinder portions 45 . . . and the exhaust pipes 51 to 53 extend downwards respectively from the cylinder portions 45 . . . on the basis of each cylinder, a lowering of the center of gravity of the vehicle 12 can be contrived.

Since the lowering of the center of gravity of the vehicle 12 is thus contrived, maneuverability can be enhanced.

In addition, since the exhaust pipes 51 to 53 of the engine 14 are bundled and extend to one of the left and right sides of the engine 14, the exhaust pipes 51 to 53 can be easily laid out on a lateral side of the engine 14.

Returning to FIG. 1, since the cylinder portions 45 of the engine 14 are inclined forwardly, the engine 14 can be arranged to be low. Since the engine 14 can thus be arranged to be low, the cover member 61 can be arranged to be low, whereby the leg passing space 65 located on the upper side of the cover member 61 can be secured to be wide.

While the exhaust pipes 51 to 53 are bundled and extended on the right side of the engine 14 in this embodiment, the exhaust pipes 51 to 53 may be bundled and extended on the left side of the engine 14.

Figure 3:
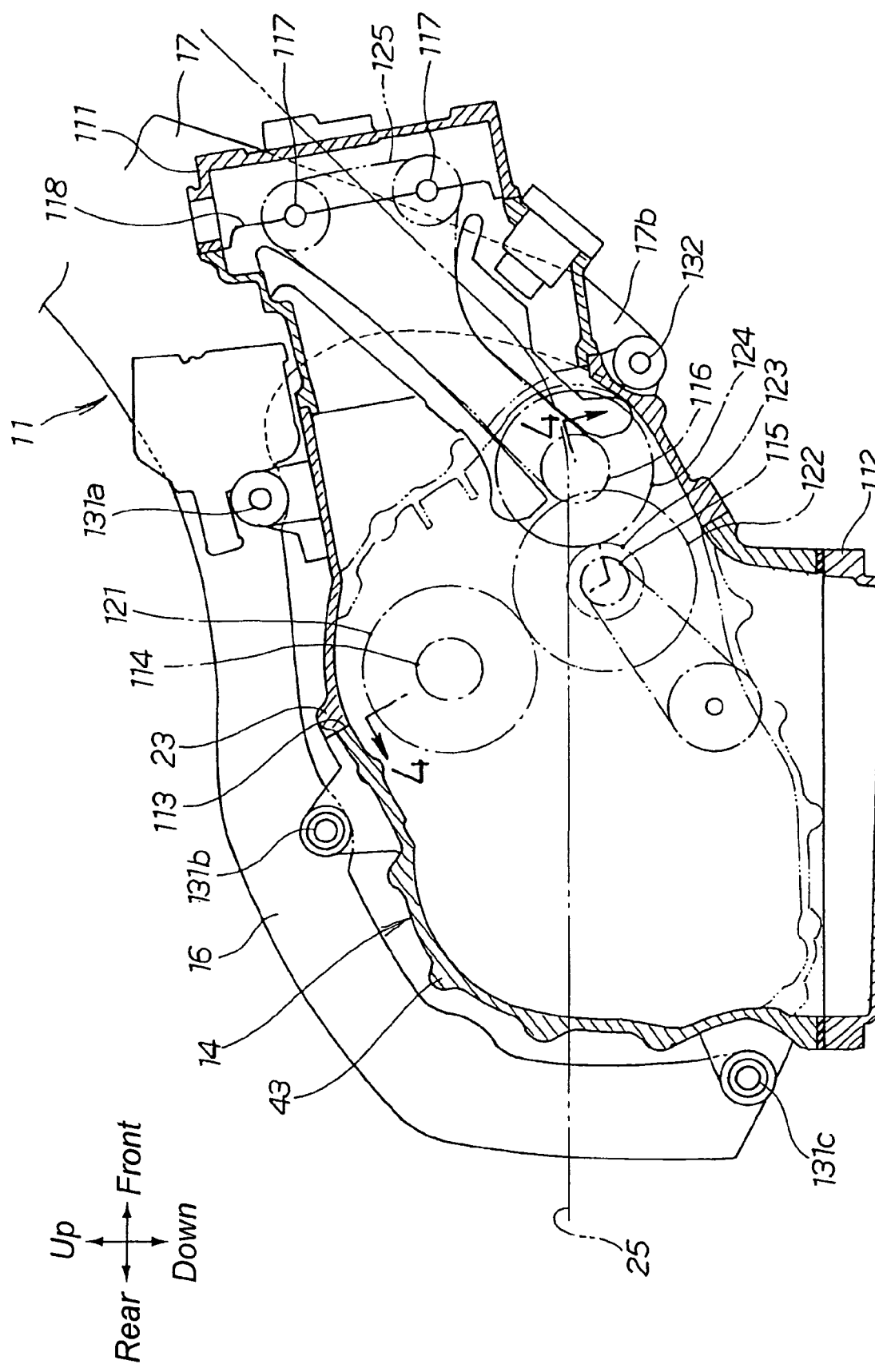
FIG. 3 is a sectional view of an essential part of the low floor type motorcycle according to the present invention.

FIG. 3 is a sectional view of an essential part of the low floor type motorcycle according to the present invention. The engine 14 includes the crankcase 43, the cylinder block 23 extends skewly forwards from the crankcase 43, a cylinder head 111 is attached to the cylinder block 23, and an oil pan 112 is attached to the crankcase 43 from the lower side.

A crankshaft 114 and a balance shaft 115 are provided at the mating plane 113 between the cylinder block 23 and the crankcase 43, a cam drive shaft 116 is provided on the front side of the balance shaft 115, and camshafts 117, 117 are provided at the mating plane 118 between the cylinder block 23 and the cylinder head 111. Gears 121, 122 are interposed between the crankshaft 114 and the balance shaft 115, gears 123, 124 are interposed between the balance shaft 115 and the cam drive shaft 116, and a cam chain 125 is wrapped around the cam drive shaft 116 and the camshafts 117, 117 so as to transmit the drive force of the crankshaft 114 to the camshafts 117, 117.

Namely, the engine 14 is provided with the balance shaft 115 for reducing the primary couple vibration. The balance shaft 115 will be detailed later.

A support structure for the engine 14 will be described.

The engine 14 is supported by a plurality of support portions 131a to 131c provided on the upper members 16 and a support portion 132 provided at lower end portions 17b of the down members 17. The engine 14 is fixed directly to the support portions 131a to 131c, 132, without any elastic member therebetween.

Specifically, the vehicle body frame 11 includes the upper members 16 extending from the head pipe 13 (see FIG. 1) to the upper side of the engine 14, and the down members 17 extending from the head pipe 13 to lateral sides of the cylinder portions 45 of the engine 14, and the engine 14 is supported by the support portions 131a to 131c, 132 inclusive of the lower end portions 17b of the down members 17.

Since the vehicle body frame 11 includes the upper members 16 extending to the upper side of the engine 14 and the down members 17 extending to lateral sides of the cylinder portions 45, the engine 14 can be arranged at a low position while securing the rigidity of connection between the vehicle body frame 11 and the engine 14 in the low floor type vehicle. With the engine 14 thus located at a low position, stability of running can be enhanced.

In addition, a crankshaft 114 which is heavy in weight is so disposed that its center is located on the upper side relative to the step floors 25 on which to put the rider's feet.

Since the center of the crankshaft 114 is located above the step floors 25, maneuverability can be enhanced by raising, to a certain extent, the center of gravity of the engine 14 itself.

In other words, by locating the engine 14 at a low position and optimizing the position of the center of gravity of the engine 14, the running performance can be further enhanced.

Besides, since the engine 14 is supported by the lower end portions 17b of the down members 17, the engine 14 can be mounted and dismounted easily.

Since the engine 14 is fixed directly to the vehicle body frame 11 without any elastic member therebetween, a predetermined vehicle body rigidity can be secured while adopting a so-called diamond type frame in which the engine 14 is utilized as a part of the vehicle body frame 11.

By enhancing the rigidity of connection between the engine 14 and the vehicle body frame 11 and setting the position of the engine 14 to be low while optimizing the position of the center of gravity, it is possible to enhance more the running performance of the low floor type vehicle.

As a result, it is possible to largely enhance the comfortableness during running, particularly during high-speed running.

Incidentally, the engine 14 may be fixed to the vehicle body frame 11 with elastic members therebetween (rubber mounting). In this case, the engine 14 is fixed to the vehicle body frame 11 with high-hardness elastic members, for example, rubber or urethane resin having a hardness of 80% or above therebetween, whereby higher order vibrations can be eliminated.

Figure 4:
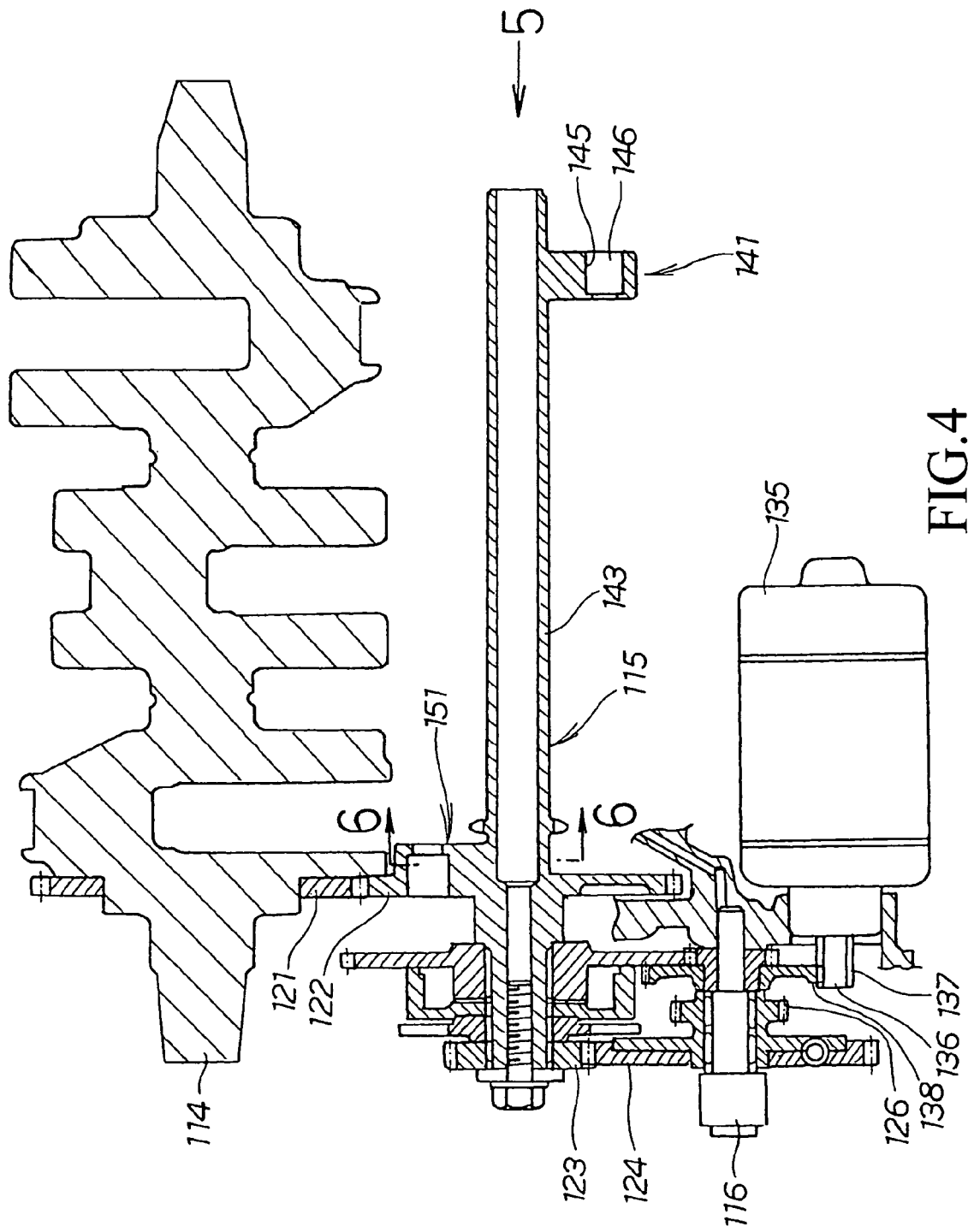
FIG. 4 is a sectional view taken along line 4-4 of FIG. 3.

FIG. 4 is a sectional view taken along line 4-4 of FIG. 3. The gear 121 for driving the balance shaft 115 is provided on the crankshaft 114, the gear 122 driven in mesh with the gear 121 is provided on the balance shaft 115, the gear 123 for driving the cam drive shaft 116 is provided on the balance shaft 115, the gear 124 meshed with the gear 123 and driven by the balance shaft 115 is provided on the cam drive shaft 116, and a sprocket 126 for transmitting the drive force to the camshafts 117, 117 is provided on the cam drive shaft 116.

FIG. 4 shows a starter motor 135. A gear 137 formed on an output shaft 136 of the starter motor 135 and a gear 138 provided on the cam drive shaft 116 are meshed with each other.

The balance shaft 115 is a member for reducing the couple vibration generated in the engine 14 (See FIG. 1).

The balance shaft 115 is provided with a pair of eccentric loads at positions remote by a predetermined amount from the shaft center, and the balance shaft 115 is rotate reversely to the crankshaft, thereby canceling the couple vibration.

The balance shaft 115 will be detailed referring to the following figures.

Figure 5:
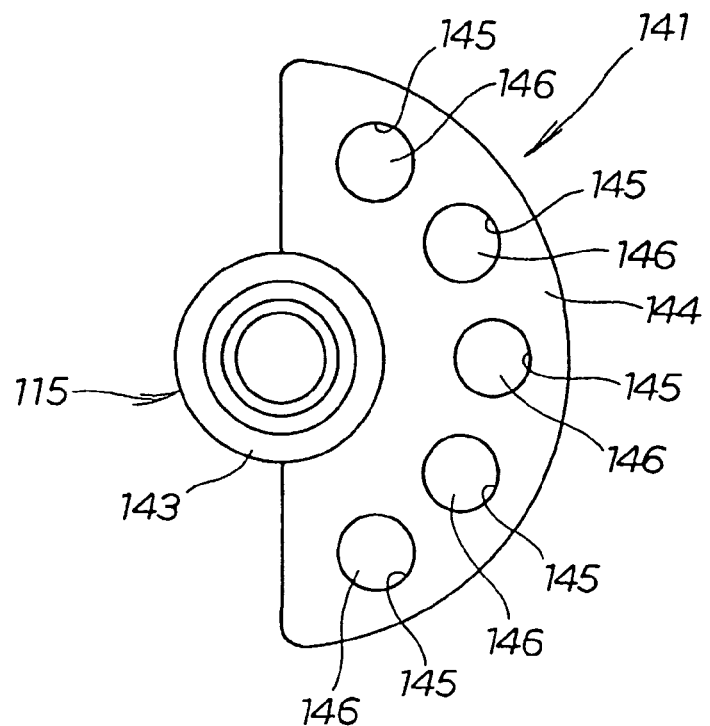
FIG. 5 is a view taken along arrow 5 of FIG. 4.

FIG. 5 is a view taken along arrow 5 of FIG. 4, and shows a first weight portion 141 possessed by the balance shaft 115.

The first weight portion 141 has a semi-circular portion formed on a shaft portion 143, thereby forming a balance weight. To be more specific, the first weight portion 141 has a configuration in which a first holder portion 144 as the semi-circular portion is attached, the first holder portion 144 is provided with five balance weight fitting holes 145 . . . circular in sectional shape, and balance weights 146 . . . are fitted in the balance weight fitting holes 145 . . . .

Further, when the balance weights 146 . . . are formed from a high-density material and are fitted in the holder portion 144, a required balance value can be secured without enlarging the semi-circular portion.

Figure 6:
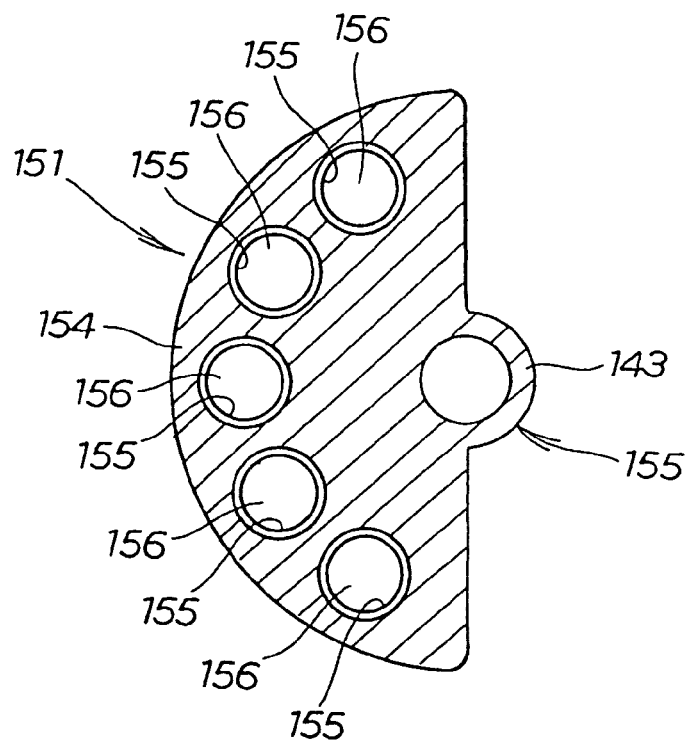
FIG. 6 is a sectional view taken along line 6-6 of FIG. 4.

FIG. 6 is a sectional view taken along line 6-6 of FIG. 4, and shows a second weight portion 151 provided on the balance shaft 115.

The second weight portion 151 has a semi-circular portion contiguous with a shaft portion 143, thereby forming a balance weight. To be more specific, the second weight portion 151 has a configuration in which a second holder portion 154 as the semi-circular portion is attached, the second holder portion 154 is provided with five balance weight fitting holes 155 . . . circular in sectional shape, and balance weights 156 . . . are fitted in the balance weight fitting holes 155 . . . .

Further, when the balance weights 156 . . . are formed from a high-density material and are fitted in the holder portion 154, a required balance value can be secured without enlarging the semi-circular portion.

Incidentally, the first weight portion 141 and the second weight portion 151 are arranged around the shaft portion 143 so as to be in opposite phases.

Returning to FIG. 1, in the in-line 3-cylinder engine 15, the balance shaft for reducing the couple vibration is provided, so that the primary couple vibration arising from the vibration phase difference between the left and right sides can be reduced. Since the primary couple vibration can be reduced, the transmission of the primary couple vibration generated from the engine 14 to the vehicle body frame 11 is suppressed.

Since the amount of primary couple vibration generated from the engine 14 and transmitted to the vehicle body frame 11 is reduced, it is difficult for the vibration of the engine 14 to be transmitted to the vehicle body 11, notwithstanding the engine 14 is fixed directly to the vehicle body frame 11.

Since the vibration of the engine 14 is transmitted to the vehicle body frame 11 with difficulty, it is possible to largely enhance the comfortableness during running, particularly during high-speed running.

The functions of the motorcycle as above-described will be described below.

Since the engine 14 is an in-line 3-cylinder engine, the displacement of each cylinder is smaller and the vertical motion component parts such as connecting rod and piston in each cylinder are lighter in weight, as compared with an in-line 2-cylinder engine, for example. Besides, by regulating the balance weights 146, 156 provided in the surroundings of the crankshaft 114, it is possible to reduce the primary vibrations of the engine 14 arising from the vertical motions of pistons and the like. In addition, the secondary vibrations of the engine arising from the left-right motions of connecting rods, piston pins and the like can be reduced. Since the secondary vibrations can be reduced, the comfortableness during running can be enhanced.

In addition, since the secondary vibration can be reduced, the vibrations at such frequencies as to easily generate sounds at exterior component parts can be reduced, in a low floor type motorcycle 10 comprising a large number of exterior component parts such as a resin-made cover member 61, for example.

Meanwhile, even in a low floor type motorcycle 10 as a motor scooter type vehicle, if a 4-cylinder or 6-cylinder engine can be applied, the secondary vibration can be reduced. However, application of a 4-cylinder or 6-cylinder engine to a low floor type motorcycle makes it difficult to retain the form of a motor scooter type vehicle, due to the need to secure the engine width.

From this point of view, in the present invention, the engine 14 is an in-line 3-cylinder engine, so that the form of the motor scooter type vehicle can be retained, without enlarging the width of the engine 14 too much.

Therefore, by adopting the in-line 3-cylinder engine, it is possible to attain a low floor type motorcycle such that the secondary vibration can be largely reduced, and an increase in engine width is suppressed.

Furthermore, since the cylinder portion 45 of the engine 14 are inclined forwardly, a lowering of the center of gravity of the vehicle 12 can be achieved. With a lowering of the center of gravity thus contrived, maneuverability can be enhanced.

Incidentally, while the balance shaft for the engine according to the present invention has been applied to a motorcycle in the embodiment, it can be applied to a four-wheel vehicle, and may be applied to general vehicles.

Figure 7:
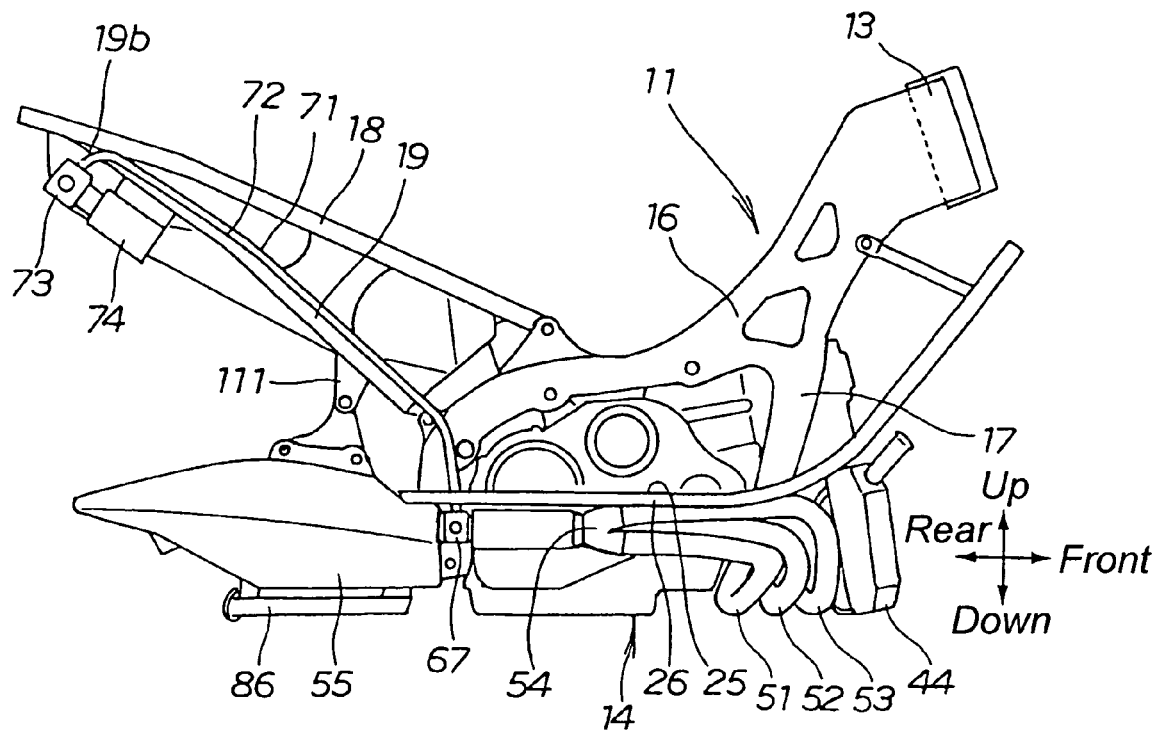
FIG. 7 is a right side view for illustrating the layout of elements around an engine in the low floor type motorcycle according to the present invention.

FIG. 7 is a right side view for illustrating the layout of elements around the engine in the low floor type motorcycle according to the present invention. The gathering portion 54 where the exhaust pipes 51 to 53 are gathered is arranged on the right side of the engine and on the lower side of the step floor 25, the exhaust valve 67 is laid out on the rear side of the gathering portion 54, and the muffler 55 is arranged on the rear side of the exhaust valve 67. The muffler 55 is integrated with the vehicle body frame 11 by drooping a stay member 111 from the support frame 19 and attaching the muffler 55 to the stay member 111.

The operating wires 71 and 72 extending from the exhaust valve 67 are placed along the support frame 19, and the servo motor 73 and the control unit 74 for driving the operating wires 71 and 72 are attached to a rear portion 19b of the support frame 19.

Figure 8:
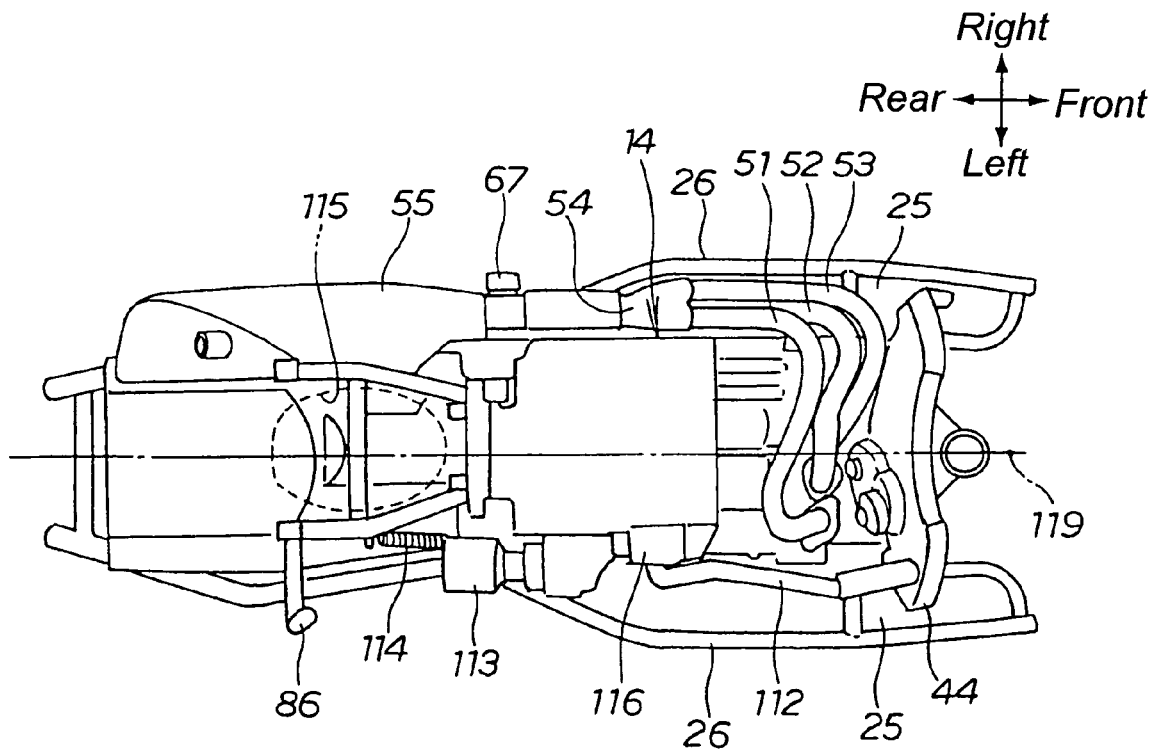
FIG. 8 is a bottom view for illustrating the layout of elements around the engine in the low floor type motorcycle according to the present invention.

FIG. 8 is a bottom view for illustrating the layout of elements around the engine in the low floor type motorcycle according to the present invention. The radiator portion 44 is disposed on the front side of the engine 14, and the radiator portion 44 and the engine 14 are connected to each other by a cooling water pipe 112. Symbol 113 denotes an output shaft of the engine 14, and 114 denotes a spring interposed between a main stand 86 and the vehicle body frame 11.

Incidentally, the power transmission mechanism is omitted in the figure.

The exhaust pipes 51 to 53 bundled are disposed on the lower side of the step floor 25 on the right side, and the gathering portion 54 is arranged on the lower side of the right step floor 25, so that a sufficient space 115 can be secured on the rear side of the engine 14. Therefore, the exhaust pipe space on the rear side of the engine 14 can be utilized, without any consideration of the interference between the exhaust pipes 51 to 53 and the rear swing arm 31 (see FIG. 1), which consideration has been needed in the conventional case of extending the exhaust pipes 51 to 53 to the rear side of the engine 14.

In other words, the engine 14 is a water-cooled type engine, the exhaust pipes 51 to 53 in the bundled state are laid out on the lower side of the step floor 25 on the right side, and the cooling water pipe 112 provided for the engine 14 is laid out on the lower side of the step floor 25 on the left side.

Incidentally, a configuration may be adopted in which the bundled exhaust pipes 51 to 53 are laid out on the lower side of the step floor 25 on the left side, and the cooling water pipe 112 is laid out on the lower side of the step floor 25 on the right side.

Namely, the exhaust pipe 51 to 53 of the engine 14 are disposed in the bundled state on the lower side of one of the left and right step floors 25, 25, and the cooling water pipe 112 provided for the engine 14 is laid out on the lower side of the other of the left and right step floors 25, 25.

Since it is necessary to avoid a rise in the temperature of cooling water, the exhaust pipes 51 to 53 must be spaced from the cooling water pipe 1112.

In the present invention, the cooling water pipe 112 and the exhaust pipes 51 to 53 are laid out respectively on the lower side of the left and right step floors 25, 25, so that the exhaust pipes 51 to 53 brought to a comparatively high temperature are disposed remote from the cooling water pipe 112, whereby cooling efficiency can be enhanced.

The engine 14 incorporates a cooling water pump 116, and the cooling water pump 116 is provided on the opposite side in the left-right direction of the exhaust pipes 51 to 53 with reference to the vehicle center line 119 in plan view.

Since it is necessary to avoid a rise in the temperature of cooling water, the exhaust pipes 51 to 53 must be spaced from the cooling water pump 1116.

In the present invention, the cooling water pump 116 and the exhaust pipes 51 to 53 are laid out respectively on the lower side of the left and right step floors 25, 25, so that the exhaust pipes 51 to 53 can be sufficiently spaced from the cooling water pump 115.

When the cooling water pump 116 and the cooling water pipe 112 are disposed on the lower side of the same step floor 25, the length of the cooling water pipe 112 extending from the cooling water pump 116 can be set small, whereby a reduction in the weight of the vehicle can be contrived.

Figure 9:
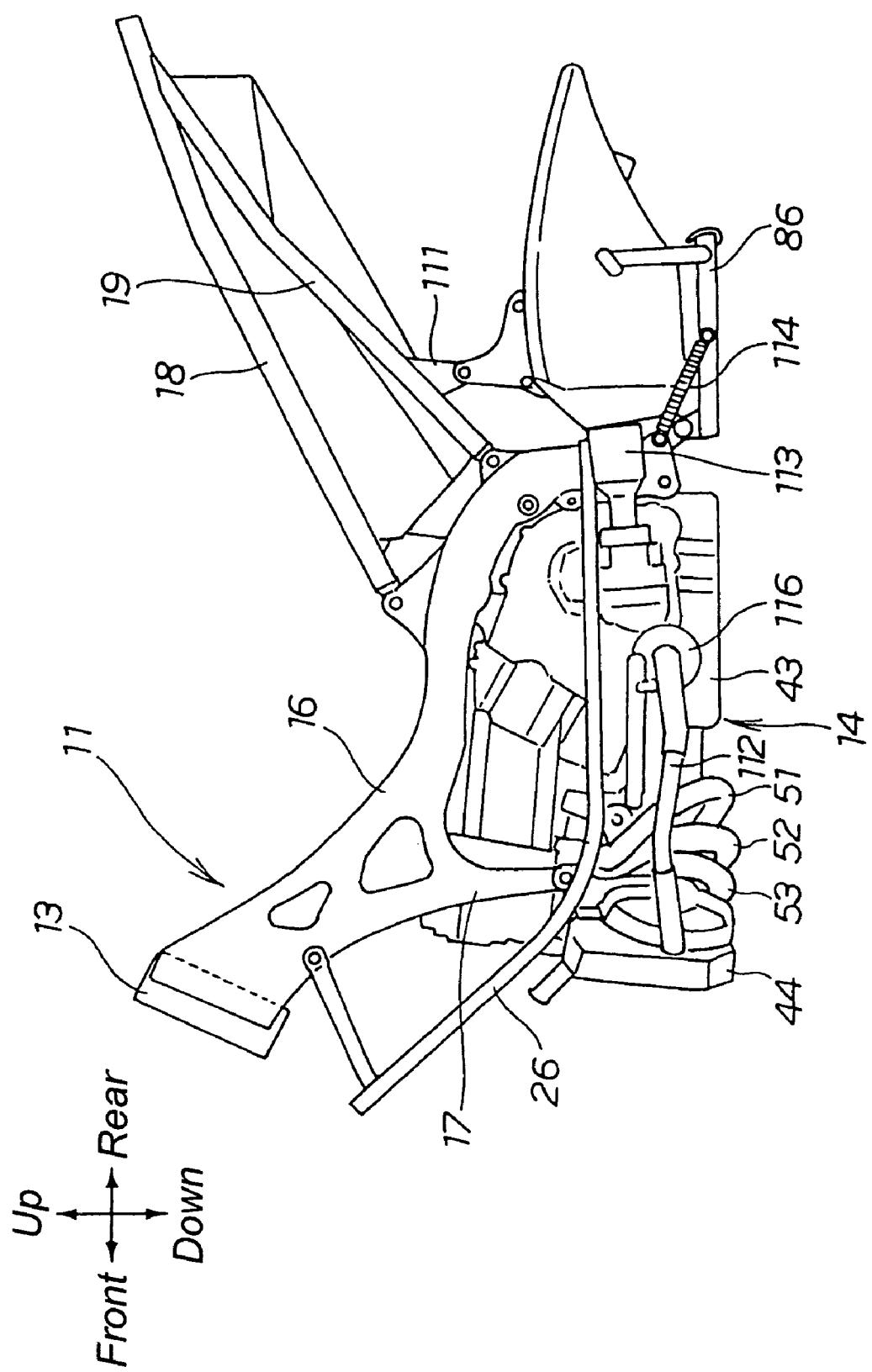
FIG. 9 is a left side view for illustrating the layout of elements around the engine in the low floor type motorcycle according to the present invention.

FIG. 9 is a left side view for illustrating the layout of elements around the engine in the low floor type motorcycle according to the present invention. The cooling water pump 116 is provided at a side surface of the crankcase 43 of the engine 14, and the cooling water pipe 112 extends forwards from the cooling water pump 116 and connected to the radiator portion 44.

Returning to FIG. 1, since the engine 14 includes the cylinder portions 45 inclined forwardly, the engine 14 can be arranged to be low. Since the engine 14 can thus be arranged to be low, the intermediate cover member 63 constituting a part of the cover member 61 can be arranged to be low, whereby the leg passing space 65 located on the upper side of the intermediate cover member 63 can be secured to be wide.

While the exhaust pipes 51 to 53 are bundled and extended on the right side of the engine 14 in this embodiment, the exhaust pipes 51 to 53 may be bundled and extended on the left side of the engine 14.

Figure 10:
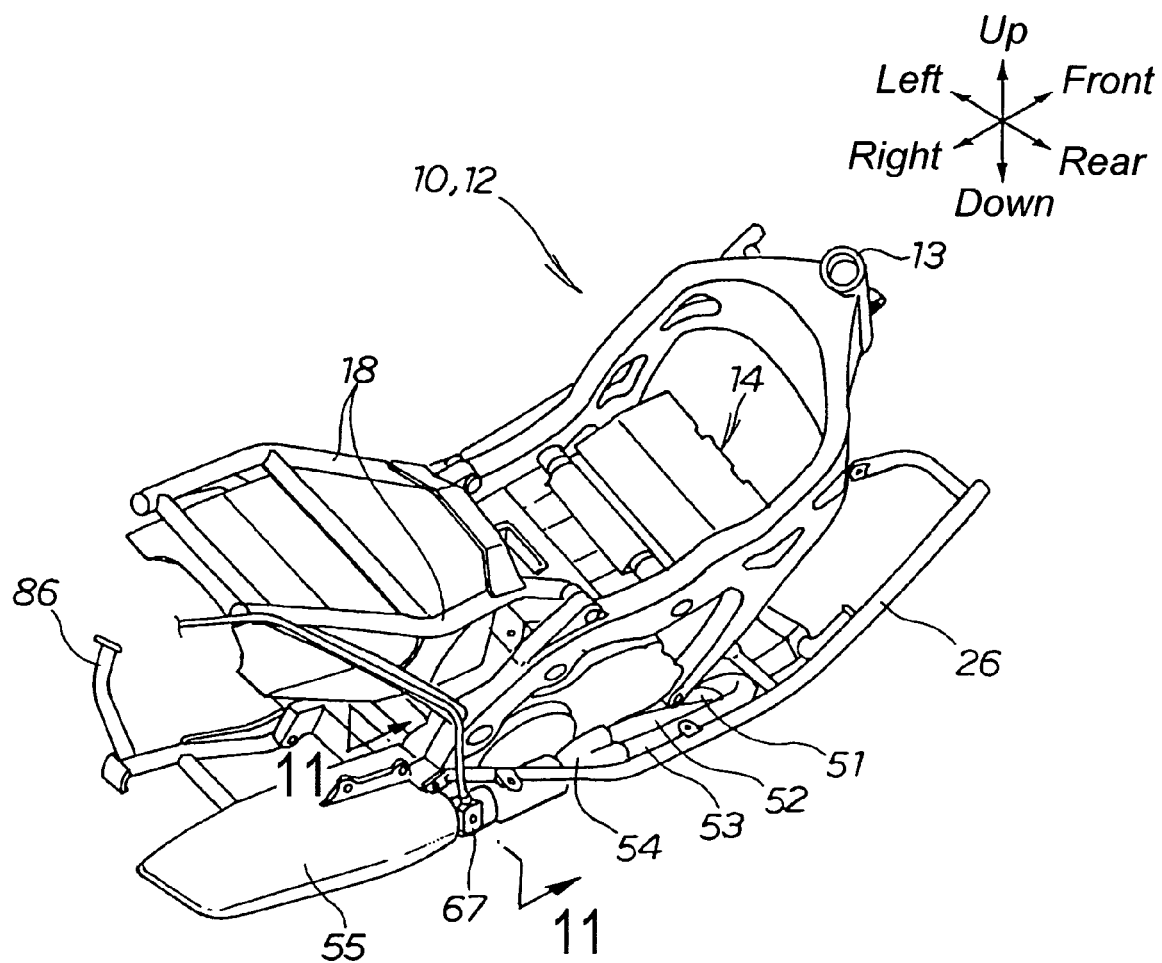
FIG. 10 is a perspective view for illustrating the layout of elements around the engine in the low floor type motorcycle according to the present invention.

FIG. 10 is a perspective view for illustrating the layout of elements around the engine in the low floor type motorcycle according to the present invention. The floor bracket 26 for attaching the step floor 25 (see FIG. 1) thereto extends on the right side of the vehicle 12, the exhaust pipes 51 to 53 and the gathering portion 54 are disposed on the lower side of the floor bracket 26, and the exhaust valve 67 for regulation of opening area according to the running conditions is provided in the vicinity of the gathering portion 54.

Figure 11:
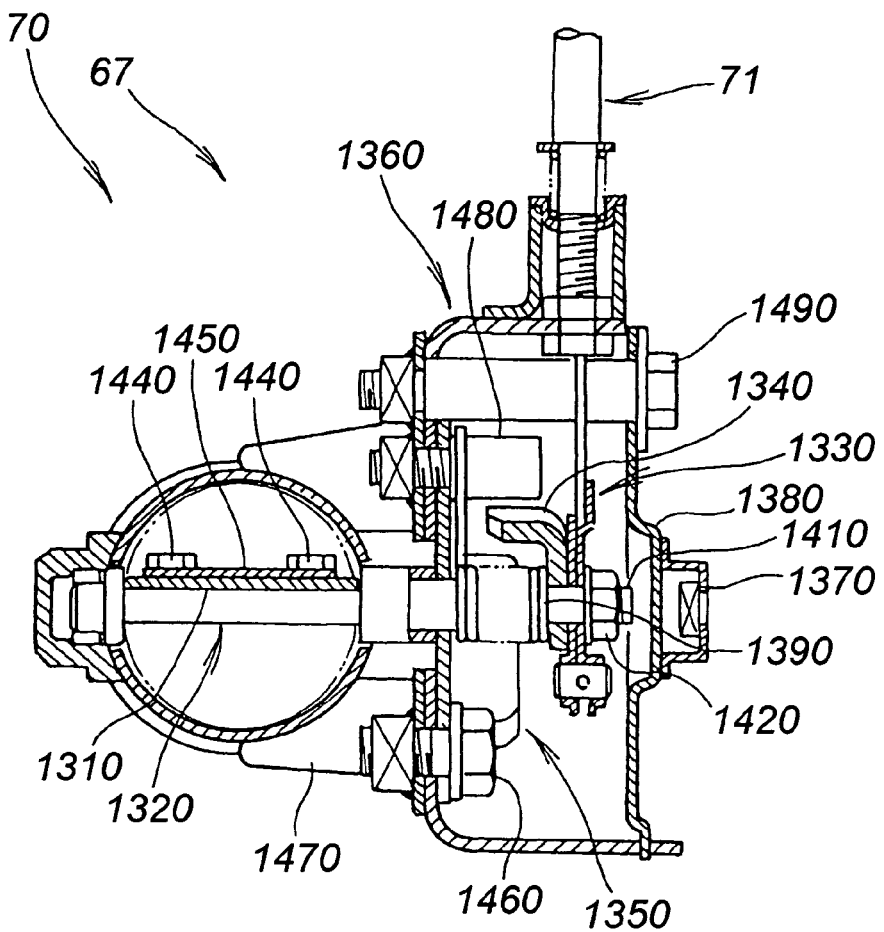
FIG. 11 is a sectional view taken along line 11-11 of FIG. 10.

FIG. 11 is a sectional view along line 11-11 of FIG. 10, and is a sectional view of the exhaust valve 67.

The exhaust valve 67 includes: a valve 1310 for varying the flow rate of the exhaust gas in the gathering portion 540; a valve rod 1320 as an exhaust valve shaft for attaching the valve 1310 thereto; a pulley 1330 for rotating the valve rod 1320; an L-shaped stopper piece 1340 formed separately from the pulley 1330 and attached to the valve rod 1320; a stopper receiver 1350 on which the stopper piece 1340 is abutted to thereby restricting the opening/closing angle of the valve 1310; a case 1360 for housing the pulley 1330, the stopper piece 1340 and the stopper receiver 1350 therein; a lid 1380 having the above-mentioned mounting portion 1370 for covering the case 1360; a torsion spring 1390 set between the case 1360 and the pulley 1330 for biasing in the opening direction of the valve 1310; and a fixing nut 1420 in screw engagement with a male screw portion 1410 formed at one end of the valve rod 1320.

FIG. 11 shows a bolt 1440 for fixing the valve 1310 to the valve rod 1320 with a washer 1450 therebetween, a bolt 1460 for fixing the case 1360 to a stay 1470 with the stopper receiver 1350 therebetween, a bolt 1480 for fixing the case 1360 to the stay 1470 with the stopper receiver 1350 therebetween and for locking one end of the torsion spring 1390, and a stepped bolt 1490 for directly fixing the lid 1380 covering the case 1360 to a stay.

Figure 12:
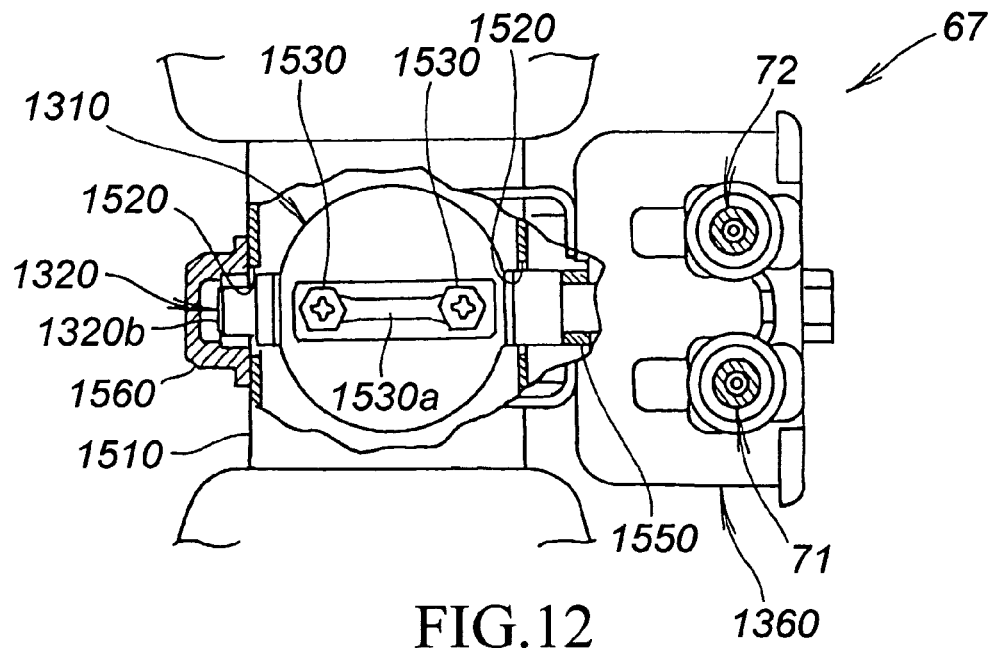
FIG. 12 is a plan view (partly sectional view) of an exhaust valve provided in the low floor type motorcycle according to the present invention.

FIG. 12 is a plan view (partly sectional view) of the exhaust valve 67 provided in the low floor type motorcycle according to the present invention. The exhaust valve 67 has a configuration in which the other end 1320b of the valve rod 1320 is inserted into through-holes 1520, 1520 in a valve mount portion 1510, the valve 1310 is attached to the other end 1320b side of the valve rod 1320 with a washer 1530a therebetween by bolts 1530, 1530, a case bearing portion 1550 of the case 1360 is inserted from one end 1320a side of the valve rod 1320, and the case 1360 is fixed to the stay 1470 (see FIG. 7) of the valve mount portion 1510, whereby the valve rod 1320 can be rotatably supported by a bearing portion 1560 and the case bearing portion 1550.

Returning to FIG. 1, the exhaust gas control system 70 comprising the above-configured exhaust valve 67 as an operating portion is attached to the vehicle body frame 11, the servo motor 73 is operated based on a command from the control unit 74, and the opening area of the exhaust valve 67 is regulated by the servo motor 73 through the operating wires 71, 72.

Returning to FIG. 8, since the exhaust valve 67 is provided in the vicinity of the gathering portion 54, it is possible, by regulating the position of the gathering portion 54 in the front-rear direction, to lay out the exhaust valve 67 in the vicinity of the gathering portion 54, without enlarging the width of the vehicle 12.

Incidentally, the exhaust valve 67 may be omitted.

Figure 13:
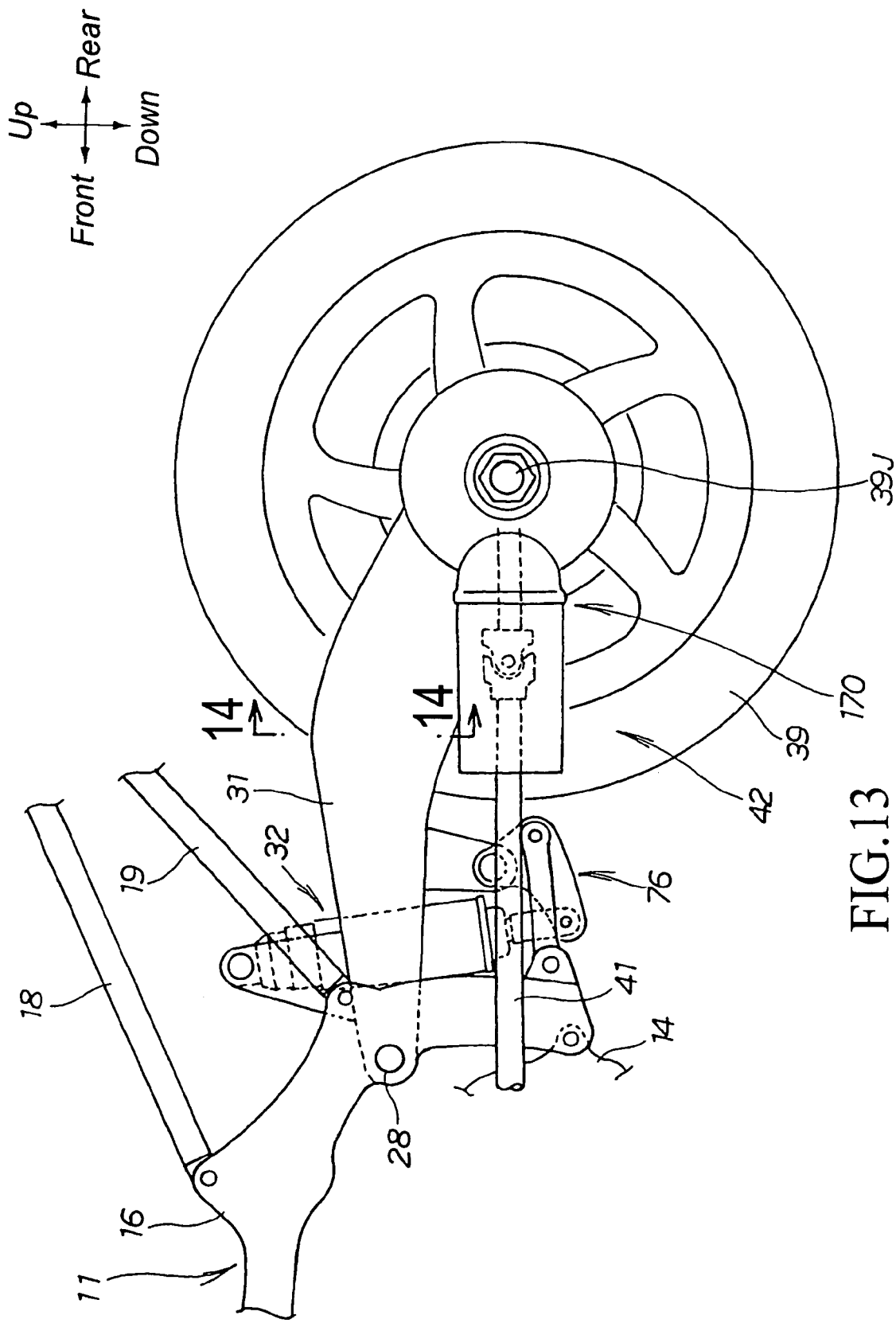
FIG. 13 is a side view for illustrating a power transmission mechanism provided in the low floor type motorcycle according to the present invention.

FIG. 13 is a side view for illustrating the power transmission mechanism provided in the low floor type motorcycle according to the present invention. The power transmission mechanism 42 is provided at a rear end portion of the rear swing arm 31 and laid out on the outside of the rear swing arm 31, the drive shaft 41 extends from the output shaft 113 (see FIG. 4) of the engine 14, and the power of the drive shaft 41 is transmitted to the rear wheel 39. A drive case 170 incorporating a transmission device for transmitting a drive force of the drive shaft 41 to the rear wheel 39 through a change in direction is arranged around an axle 39J of the rear wheel 39.

The rear swing arm 31 is a curved frame which is protuberant to the upper side.

Since the rear swing arm 31 is thus curved, the appearance quality of the rear swing arm 31 can be enhanced.

The pivot shaft 28 is laid out on the upper side of the drive shaft 41, the rear swing arm 31 protuberant to the upper side extends rearwards from the pivot shaft 28, a lower end portion of the rear cushion unit 32 is attached to the rear swing arm 31 through the link mechanism 76, and an upper end portion of the rear cushion unit 32 is fixed to the vehicle body frame 11 side.

Namely, the power transmission mechanism 42 has the drive case 170 provided at a rear end portion of the rear swing arm 31 and incorporating the transmission device for transmitting the drive force of the drive shaft 41 to the rear wheel 39 through a change in direction. The drive shaft 41 is laid out on the lower side of the rear swing arm 31 and on the lower side of the pivot shaft 28. The transmission device will be detailed later.

Figure 14:
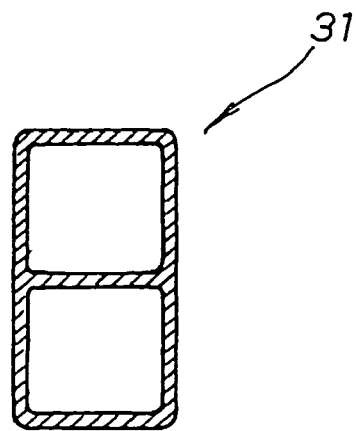
FIG. 14 is a sectional view taken along line 14-14 of FIG. 13.

FIG. 14 is a sectional view along line 14-14 of FIG. 13, and shows a section of the rear swing arm 31.

The sectional shape of the rear swing arm 31 is not set to be an ordinary rectangular shape but is set to be a state like two rectangular boxes stacked, whereby the section modulus can be enhanced. Since the section modulus is thus enhanced, the flexural rigidity of the rear swing arm 31 can be enhanced.

The sectional shape may not necessarily be the state (two rectangular boxes stacked); for example, other shapes, for example, three rectangular boxes stacked, may be adopted.

Figure 15:
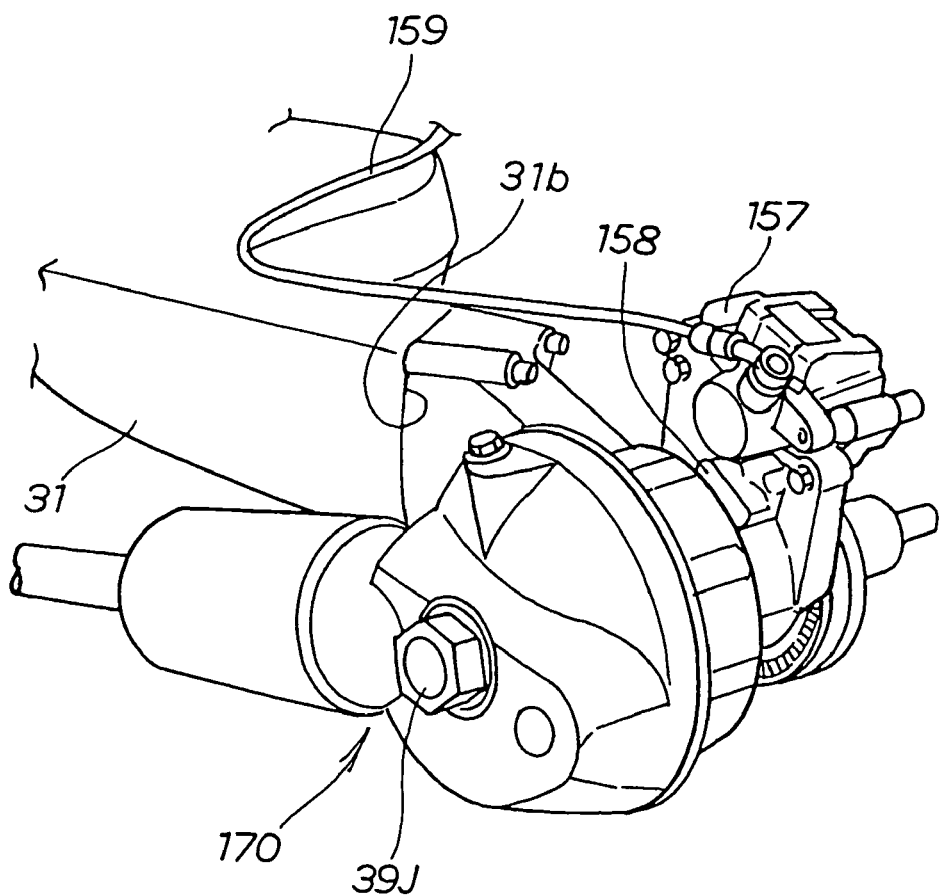
FIG. 15 is a perspective view for illustrating the power transmission mechanism provided in the low floor type motorcycle according to the present invention.

FIG. 15 is a perspective view for illustrating the power transmission mechanism provided in the low floor type motorcycle according to the present invention. The axle 39J of the rear wheel 39 and the drive case 170 around the axle 39J are provided, a rear end portion 31b of the rear swing arm 31 is connected to the drive case 170, a rear brake unit 157 is fixed in the axial direction, and a wheel speed sensor 158 for ABS (Antilock Braking System), for example, is attached to a part of the rear brake unit 157. FIG. 15 also shows a brake pipe 159.

FIG. 16(a) is a sectional view for illustrating the power transmission mechanism provided in the low floor type motorcycle according to the present invention.

FIG. 16(a) shows the embodiment. The power transmission mechanism 42 includes the drive shaft 41, and the drive case 170 incorporating the transmission device 1540 for transmitting the drive force of the drive shaft 41 to the rear wheel 39 through a change in direction. Here, the transmission device 1540 includes a pair of final gear sets 161 for changing the direction of the drive force, and a damper device 162 includes a damper member 166 which is interposed between the final gear set 161 and the axle 39J of the rear wheel 39 and which damps the shocks due to torque variations.

The detailed configuration will be described. The final gear set 161 includes a first final gear 163 and a second final gear 164. The first final gear 163 is attached to a rear end portion 41b of the drive shaft 41, the second final gear 164 is meshed with the first final gear 163, and the second final gear 164 is turnably disposed coaxially with the center of the axle 39J of the rear wheel 39.

The damper device 162 includes a damper member 166 and a damper holder 167. The damper member 166 is disposed at a rear surface 164b of the second final gear 164, the disk-like damper holder 167 fixed to the axle 39J of the rear wheel 39 is disposed at the damper member 166, and the damper member 166 is clamped between the rear surface 164b of the second final gear 164 and a surface 167a of the damper holder 167, whereby the drive force of the drive shaft 41 is transmitted to the axle 39J of the rear wheel 39 while damping the shocks due to torque variations of the drive shaft 41.

The drive case 170 covering the power transmission mechanism 42 is for covering the damper device 162 and the transmission device 1540, and includes a damper case 174 and a differential case 173. A drive chamber 171 for incorporating the damper device 162 and the transmission device 1540 therein is formed on the inside of the cases 173, 174. The drive chamber 171 is filled with an oil.

FIG. 16(a) shows a shaft case 172, which is a member provided on the front side of the differential case 173 covering the drive shaft 41, bearings 176a to 176d, a rear disk brake disk 177, and a wheel 178 of the rear wheel 39.

Specifically, the drive case 170 incorporating the transmission device 1540 for transmitting the drive force of the drive shaft 41 through a change in direction is provided at a rear end portion 31b of the rear swing arm 31, the damper device 162 for damping the shocks exerted on the rear wheel 39 is provided inside the drive case 170, and the damper device 162 is provided with the damper member 166 coaxially with the axle 39J of the rear wheel 39.

FIG. 16(b) shows a comparative example, of which the points quite different from the embodiment of FIG. 16(a) will be described.

A drive case 170B for covering a transmission device 1540B includes a damper case 174B provided at a roughly central portion of the axle 39Jb of a rear wheel 39B so as to cover a damper device 162B, a lid member 181 provided on the drive shaft 41B side of the damper case 174B in the axial direction of the rear wheel 39B so as to cap the damper case 174B, and a differential case 173B for covering the transmission device 1540 from the outside of the lid member 181.

The drive case 170B includes the damper case 174B and the lid member 181 and the differential case 173B, a damper chamber 182 incorporating the damper device 162B is formed on the inside of the damper case 174B, and a differential chamber 183 incorporating the transmission device 1540B is formed on the inside of the differential case 173B. The damper chamber 182 and the differential chamber 183 are each filled with an oil.

Thus, the damper chamber 182 is provided on the wheel 178B side of the rear wheel 39B, and the damper chamber 182 is provided separately from the differential chamber 183.

The length of the axle 39J of the rear wheel 39 will be compared between FIG. 16(a) and FIG. 16(b).

In FIG. 16(a), the drive chamber 171 incorporating the transmission device 1540 and the damper device 162 is provided on the inside of the drive case 170, so that the length of the axle 39J is reduced by a length W, as compared with the axle in FIG. 16(b).

Since the transmission device 1540 and the damper device 162 are incorporated in the drive case 170, the transmission device 1540 and the damper device 162 can be disposed collectively in one chamber. For example, it is unnecessary to provide a partition wall for partitioning the transmission device 1540 and the damper device 162 from each other.

In the case where the damper device 162 is provided with the damper member 166 coaxially with the axle 39J of the rear wheel 39, the length of the axle 39J of the rear wheel 39 can be reduced if the partition wall for partitioning the transmission device 1540 and the damper device 162 from each other is not needed. When the length of the axle 39J of the rear wheel 39 can be reduced, the width of the vehicle 12 can be set smaller.

In addition, the shaft case 172 can be reduced in size, as compared with the case where the shaft case 172 for covering the drive shaft 41 is provided with the damper member 166.

The functions of the low floor type motorcycle described above will be described below.

Returning to FIG. 8, since the plurality of exhaust pipes 51 to 53 are bundled, the exhaust pipes 51 to 53 can be concentrated on one of the left and right sides of the vehicle body frame 11, without being dispersed with respect to each other. Since the exhaust pipes 51 to 53 can be concentrated on one of the left and right sides of the vehicle body frame 11, the space around the engine 14 can be saved.

In addition, since the exhaust pipes 51 to 53 are disposed on the lower side of the step floor 25, the appearance quality of the low floor type motorcycle can be enhanced.

Since the exhaust pipes 51 to 53 are bundled together and laid out on the lower side of the step floor 25, the exhaust pipes 51 to 53 can be concentrated on one of the left and right sides of the vehicle body frame 11, without being dispersed with respect to each other. Since the exhaust pipes 51 to 53 can be arranged so as to be concentrated on one of the left and right sides of the vehicle body frame 11, the exhaust pipes are not passed on the rear side of the engine 14, so that the exhaust pipe space (the space 115 for disposing the exhaust pipes) on the rear side of the engine 14 can be utilized effectively. Since the exhaust pipe space on the rear side of the engine 14 can thus be utilized effectively, it is possible to enhance the degree of freedom in designing the vehicle, for example, in laying out the rear swing arm 31 (symbol 31 in FIG. 1).

The gathering portion 54 is arranged on the lower side of the step floor 25.

In the low floor type motorcycle 10, spaces triangular in section which are each formed by a side surface of the engine 14 and a surface for securing a bank angle are provided on the lower side of the step floors 25, 25, so that the gathering portion 54 can be freely arranged on the lower side of either of the step floors 25, 25. Since the degree of freedom in laying out the gathering portion 54 is enhanced, it is possible to freely set the lengths of the exhaust pipes 51 to 53 from the cylinders to the gathering portion 54, for example. When the lengths of the exhaust pipes to the gathering portion 54 can thus be set freely, adjustment of power performance between the cylinders can be easily carried out, and the degree of freedom in designing can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle with a low floor comprising:
    step floors on which to put a rider's feet on left and right sides of a vehicle body frame;
    a cover member provided between said step floors to cover said vehicle body frame;
    an engine provided on a lower side of said cover member; and
    a plurality of exhaust pipes extending respectively from cylinders of said engine, said exhaust pipes being gathered at a gathering portion,
    wherein said engine is an in-line 3-cylinder engine having cylinder portions inclined forwardly, and
    wherein said engine includes a cooling water pipe, and said cooling water pipe is disposed on an opposite side in the left-right direction of said exhaust pipes with reference to a vehicle center line in plan view.

2. The motorcycle with a low floor as set forth in claim 1, wherein said engine is provided with a balance shaft for reducing primary couple vibration.

3. The motorcycle with a low floor as set forth in claim 1, wherein said vehicle body frame includes:
    upper members extending from a head pipe to an upper side of said engine; and
    down members extending from said head pipe to lateral sides of cylinder portions of said engine, said engine being supported by lower end portions of said down members.

4. The motorcycle with a low floor as set forth in claim 2, wherein said vehicle body frame includes:
    upper members extending from a head pipe to an upper side of said engine; and
    down members extending from said head pipe to lateral sides of cylinder portions of said engine, said engine being supported by lower end portions of said down members.

5. The motorcycle with a low floor as set forth in claim 1, wherein said engine is fixed directly to said vehicle body frame, without any elastic member therebetween.

6. The motorcycle with a low floor as set forth in claim 1, wherein said engine is a water-cooled type engine, and
    wherein the cooling water pipe is disposed on a lower side of said step floor and on another side opposite to the one side where said exhaust pipes are disposed.

7. A motorcycle with a low floor comprising:
    step floors on which to put a rider's feet on left and right sides of a vehicle body frame;
    a cover member provided between said step floors to cover said vehicle body frame;
    an engine disposed on a lower side of said cover member; and
    a plurality of exhaust pipes extending respectively from cylinders of said engine, said exhaust pipes being gathered at a gathering portion,
    wherein said plurality of exhaust pipes are disposed in a state of being bundled on a lower side of one of said step floors on the left and right sides,
    wherein said engine is a water-cooled type engine, and
    a cooling water pipe provided for said engine is disposed on the lower side of said step floor and on another side opposite to the one side where said exhaust pipes are disposed.

8. The motorcycle with a low floor as set forth in claim 7, wherein said gathering portion is disposed on the lower side of said step floor.

9. The motorcycle with a low floor as set forth in claim 7, wherein said cooling water pipe is disposed on the opposite side in the left-right direction of said exhaust pipes with reference to a vehicle center line in plan view.

10. The motorcycle with a low floor as set forth in claim 7, wherein and said cooling water pipe is disposed on an opposite side in the left-right direction of said exhaust pipes with reference to a vehicle center line in plan view.

11. The motorcycle with a low floor as set forth in claim 7, wherein an exhaust valve adapted to regulate an opening area according to the running conditions is provided in the vicinity of said gathering portion.

12. The motorcycle with a low floor as set forth in claim 7, wherein said engine is fixed directly to said vehicle body frame, without any elastic member therebetween.

13. A motorcycle with a low floor comprising:
    step floors on which to put a rider's feet on left and right sides of a vehicle body frame;
    a cover member provided between said step floors to cover said vehicle body frame;
    an engine disposed on a lower side of said cover member, and a plurality of exhaust pipes extending respectively from cylinders of said engine, said exhaust pipes being gathered at a gathering portion,
    wherein said engine has cylinder portions inclined forwardly, each of said exhaust pipes extending downwards from a respective one of the cylinder, and said exhaust pipes being bundled and extending to one of left and right sides of said engine.

14. The motorcycle with a low floor as set forth in claim 13, wherein an exhaust valve adapted to regulate an opening area according to the running conditions is provided in the vicinity of said gathering portion.

15. The motorcycle with a low floor as set forth in claim 13, wherein said engine is fixed directly to said vehicle body frame, without any elastic member therebetween.

* * * * *